United States Patent
Ueda et al.

[11] Patent Number: 6,077,493
[45] Date of Patent: Jun. 20, 2000

[54] METHOD FOR REMOVING NITROGEN OXIDES

[75] Inventors: Atsushi Ueda; Tetsuhiko Kobayashi; Hiroyasu Takenaka, all of Ikeda, Japan

[73] Assignee: Agency of Industrial Science & Technology, Tokyo, Japan

[21] Appl. No.: 09/063,787

[22] Filed: Apr. 22, 1998

[30] Foreign Application Priority Data

May 2, 1997 [JP] Japan .................................. 9-130419

[51] Int. Cl.$^7$ ............................. B01J 23/60; B01J 23/44; B01J 23/42
[52] U.S. Cl. ........................................................ 423/239.1
[58] Field of Search ..................... 502/339, 327, 502/329, 262, 333; 423/213.5, 239.1, 239.2

[56] References Cited

U.S. PATENT DOCUMENTS

| | | | |
|---|---|---|---|
| 4,123,391 | 10/1978 | Noguchi et al. | 423/213.5 |
| 4,199,555 | 4/1980 | Itoh et al. | 423/239.1 |
| 5,102,853 | 4/1992 | Chatta et al. | 502/333 |
| 5,401,478 | 3/1995 | Chang et al. | 423/239.2 |
| 5,543,124 | 8/1996 | Yokota et al. | 423/239.1 |
| 5,772,977 | 6/1998 | Jenkins et al. | 502/333 |

OTHER PUBLICATIONS

Ueda et al. "Two reaction Paths at Different Temperatures in the Reduction of Nitrogen Monoxide with Hydrogen over Supported Palladium Catalysts" Chemistry Letters, The Chemical Society of Japan, pp. 595–6, 1998.

Ueda et al. "Two conversion maxima at 373 and 573 K in the reduction of nitrogen monoxide with hydrogen over Pd/TiO2 catalyst" Catalysis Today. (45) (1998) 135–138.

*Primary Examiner*—Steven P. Griffin
*Assistant Examiner*—Maribel Medina
*Attorney, Agent, or Firm*—Arent, Fox, Kintner, Plotkin & Kahn

[57] ABSTRACT

There are disclosed a nitrogen oxide removal catalyst comprising palladium fixed on at least one metal oxide selected from the group consisting of titanium oxide, aluminum oxide, zinc oxide, and magnesium oxide, and a method for removing nitrogen oxides, comprising bringing a nitrogen oxide-containing gas into contact with the above-mentioned catalyst in the presence of hydrogen.

5 Claims, 1 Drawing Sheet

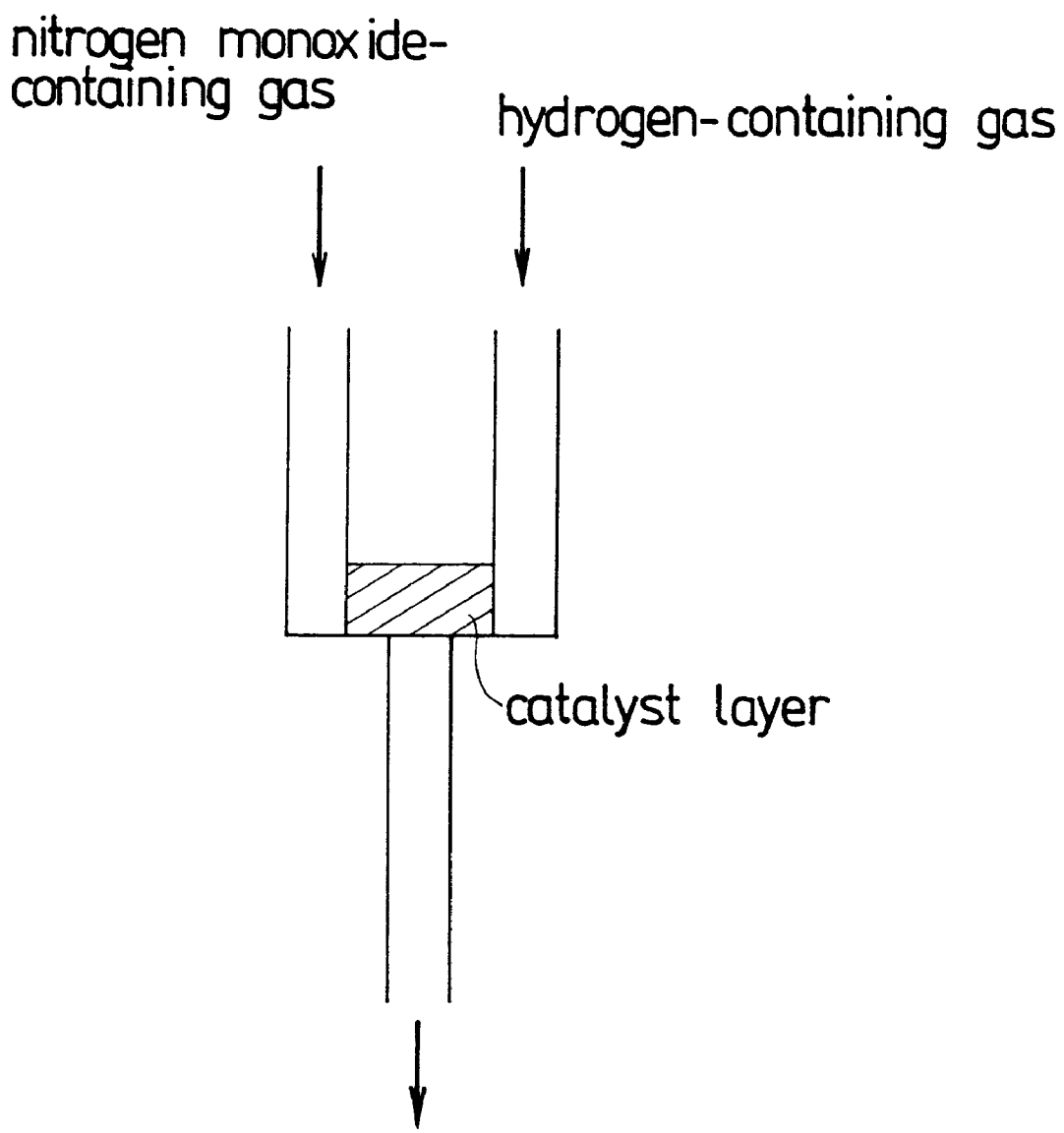

METHOD FOR REMOVING NITROGEN OXIDES

BACKGROUND OF THE INVENTION

The present invention relates to a catalyst for nitrogen oxide removal and a method for removing nitrogen oxides.

Nitrogen oxides (nitrogen monoxide, nitrogen dioxide, nitrous oxide, etc.), incomplete combustion components (carbon monoxide, hydrogen, hydrocarbons, etc.), and water are major components of exhaust gases exhausted from various internal-combustion engines, combustion apparatuses, etc. Among them, nitrogen oxides are not only harmful to the human body but also one of principal substances causative of acid rain. Thus, countermeasures against nitrogen oxides are desired.

Researches on catalysts for reducing and removing nitrogen oxides using a reducing agent as such a countermeasure are now under study everywhere. The selective catalyst reduction method using ammonia and the three-way catalyst method in particular are known among methods of removing nitrogen oxides from exhaust gases.

The ammoniac selective reduction method is a method wherein nitrogen oxides are reduced and removed using ammonia as the reducing agent and a catalyst comprising vanadium oxide and titanium oxide as the basic material. This method is however restricted in uses and places wherein it can be employed because ammonia is intractable.

On the other hand, the three-way catalyst method is a method wherein nitrogen oxides are reduced and removed using hydrocarbons, carbon monoxide, etc. present in exhaust gases as the reducing agent. According to this method, however, a reaction of the reducing agents with oxygen proceeds preferentially to the reaction of the reducing agents with nitrogen oxides when a high concentration (about 1 to 10%) of oxygen exists in an exhaust gas, leading to the problem that nitrogen oxides cannot effectively be reduced and removed.

Accordingly, in order to solve these technical problems, there is proposed a method of selectively reducing nitrogen oxides using a hydrocarbon as the reducing agent and a catalyst comprising a copper ion-exchanged zeolite, aluminum oxide, etc. as the basic active substance. According to this method, nitrogen oxides can be reduced and removed even if oxygen is coexistent.

However, the foregoing selective reduction method involves such problems that the reaction temperature region where reduction is possible is usually as high as 400° C. or above, and that the removal performance is notably lowered if moisture is contained in an exhaust gas. In this respect, there is room for improvements.

SUMMARY OF THE INVENTION

Accordingly, an object of the present invention is to provide a nitrogen oxide removal catalyst capable of exhibiting an excellent catalytic action even at a comparatively low temperature and even in the presence of water and oxygen. Another object of the present invention is to provide an advantageous process for removing nitrogen oxides using the above-mentioned catalyst.

As a result of intensive investigations in view of the foregoing problems of the prior art, the inventors of the present invention have found out that a catalyst having a specific composition can exhibit an excellent catalytic action, and have finally completed the present invention.

Specifically, the present invention is directed to the following nitrogen oxide removal catalyst and nitrogen oxide removal method:

The nitrogen oxide removal catalyst comprises palladium fixed on at least one metal oxide selected among titanium oxide, aluminum oxide, zinc oxide, and magnesium oxide.

The method for removing nitrogen oxide comprises bringing a nitrogen oxide-containing gas into contact with the above-mentioned nitrogen oxide removal catalyst in the presence of hydrogen.

BRIEF DESCRIPTION OF THE DRAWINGS

FIG. 1 is a schematic illustration of an example of a nitrogen oxide removal unit for use in the present invention.

DESCRIPTION OF THE PREFERRED EMBODIMENTS

At least one metal oxide among titanium oxide, aluminum oxide, zinc oxide and magnesium oxide is used in the nitrogen oxide removal catalyst. Among these metal oxides, titanium oxide and metal oxides in the form of a combination of titanium oxide with zinc oxide (including mixtures thereof and composite oxides thereof, etc.) are preferably used. In this case, commercially available metal oxides can be used as such.

The palladium content (amount of fixed palladium) may be appropriately determined in accordance with the use of the final product and the like. Palladium may usually be contained in an amount of about 0.01 to 30 wt. %, preferably 0.1 to 5 wt. %, based on the total amount of the catalyst of the present invention.

The catalyst of the present invention may contain other components (e.g., a shaping assistant such as silica, silica sol or clay) in so far as the effects of the present invention are not spoiled thereby.

The method of fixing palladium on a metal oxide is not particularly limited in so far as palladium can be physically or chemically fixed on the oxide. For example, a metal oxide may be impregnated with a solution (e.g., aqueous solution) of a palladium compound and then fired in air.

In this case, examples of the usable palladium compound, though not particularly limited as long as they are soluble in a proper solvent, include palladium chloride, palladium nitrate, palladium acetate, palladium sulfate, palladium acetylacetate, and tetraammine palladium dichloride. Use of palladium nitrate or tetraammine palladium dichloride is especially preferred. The amount of the palladium compound to be added may be appropriately adjusted in such a way that the final palladium content is in the aforementioned range.

The solution of the palladium compound may be used by any method such as impregnation, coating or spraying in so far as it can be brought into contact with the metal oxide. Also the form of the metal oxide is not particularly limited in so far as it can be brought into sure contact with the palladium compound. For example, the metal oxide can be handled in the form of a powder, granules, shapes, or the like. For example, a powder of the metal oxide is put into the solution of the palladium compound, and the resulting mixture is stirred at a temperature of about 40 to 80° C. for about 30 minutes to 3 hours, whereby the metal oxide can be impregnated with the palladium compound.

After the metal oxide is brought into contact with the solution of the palladium compound, it may be dried under reduced pressure if necessary. Drying under reduced pressure may be done according to any known method such as use of a rotary evaporator. After such drying, calcining is done.

The calcining temperature may be suitably varied in accordance with the metal oxide used, the temperature region where the catalyst is used, etc., and is usually about 200 to 700° C., preferably 300 to 500° C. The calcining time may be appropriately determined in accordance with the calcining temperature and the like. The calcining atmosphere may be an oxidizing atmosphere (e.g., air), and may also be a reducing atmosphere (e.g., hydrogen), if necessary.

Calcination produces the catalyst of the present invention having a given amount of palladium fixed on the metal oxide. The calcined material may be subjected to pulverization, shaping or the like into a suitable form if necessary. Although the catalyst of the present invention may be used as such, it may also be used in such a way as to be supported on at least one of metal carriers and metal oxide carriers. Examples of such metal carriers include aluminum, iron, copper, and stainless steel, at least one of which may be used. Examples of such metal oxide carriers include aluminum oxide, silica, zeolite, cordierite, and titanium oxide, at least one of which may be used. Among them, aluminum oxide or cordierite is especially preferably used. Although the amount of the catalyst to be supported may be appropriately varied in accordance with the use of the final product and the like, it is usually about 0.1 to 30 wt. %, preferably 1 to 20 wt. %.

The method of removing nitrogen oxides with the catalyst according to the present invention can be carried out by bringing a nitrogen oxide-containing gas into contact with the catalyst preferably in the presence of hydrogen.

The hydrogen concentration in the reaction system may be such that hydrogen exists in an amount at least necessary for reduction of all nitrogen oxides ($NO_x$) to nitrogen (preferably at least 3 times as much as the $NO_x$ concentration). The necessary amount may be appropriately determined in accordance with the $NO_x$ concentration, the catalyst used, the atmosphere, etc. It is to be noted that, since the $NO_x$ reduction is a reaction competitive with the reaction of oxygen with hydrogen (reducing agent), the rate of $NO_x$ reduction can be enhanced as the hydrogen concentration is increased.

The nitrogen oxide-containing gas as the object of treatment may contain any of nitrogen oxides ($NO_x$). Further, even if moisture and oxygen are contained in the nitrogen oxide-containing gas or the reaction system, the catalyst of the present invention can exhibit an excellent catalytic action. The reaction temperature is not particularly limited. Nitrogen oxides can be effectively removed particularly at a temperature of 400° C. or below, preferably 300° C. or below. The reaction temperature is preferably 100° C. to 350° C. The amount (flow rate) of the nitrogen oxide-containing gas may be appropriately varied in accordance with the composition of nitrogen oxides in the gas and the like. For example, it may be about 300 ml/min per gram of the catalyst of the present invention when the composition comprises 1,000 ppm of nitrogen monoxide (NO), 3,000 ppm of hydrogen, 5 vol. % of oxygen and 10 vol. % of water.

Further, the method of the present invention can be carried out particularly by bringing the nitrogen oxide-containing gas and a hydrogen-containing gas into contact with the catalyst of the present invention. For example, a branch pipe as shown in FIG. 1 or the like may be used to feed the nitrogen oxide-containing gas and the hydrogen-containing gas from respectively separate directions, whereby they are combined with each other substantially on the catalyst. Thus, a better effect can sometimes be obtained in the case where the hydrogen-containing gas is separately fed on the catalyst than in the case where hydrogen is made present from the first. The hydrogen concentration of the hydrogen-containing gas, though not particularly limited, may be usually at least equal to the $NO_x$ concentration (preferably at least 3 times as high as the $NO_x$ concentration). In this case, the same nitrogen oxide-containing gas as that described above can be used. The ratio of the nitrogen oxide-containing gas to the hydrogen-containing gas, which may be appropriately determined in accordance with the concentrations of the two gases and the like, may be usually about 1:1 to 1:1000 in terms of flow rate, provided that it may be outside the above-mentioned range of flow rate in so far as the hydrogen concentration is at least equal to the $NO_x$ concentration (preferably at least 3 times as high as the $NO_x$ concentration).

The following Examples and Test Examples will make the features of the present invention clearer.

EXAMPLE 1

A solution of 0.246 g of tetraammine palladium dichloride [$Pd(NH_3)_4Cl_2 \cdot H_2O$] in 30 ml of distilled water was poured into a short-necked kjeldahl flask (capacity: 200 ml) containing 10.0 g of a titanium oxide ($TiO_2$) powder ("P-25" manufactured by Nippon Aerosil Co., Ltd.).

This flask was attached to a rotary evaporator. After agitation in a water bath at 50° C. for one hour, water was evaporated under reduced pressure to obtain a dry solid product. This dry solid product was calcined in air at 500° C. for 5 hours to obtain a titanium oxide catalyst having 1 wt. % of palladium fixed thereon (Sample No. 1).

EXAMPLE 2

Substantially the same procedure as that of Example 1 except that aluminum oxide ("JRC-ALO-7," Reference Catalyst, Catalysis Society of Japan) was used instead of the titanium oxide was repeated to obtain an aluminum oxide catalyst having 1 wt. % of palladium fixed thereon (Sample No. 2).

EXAMPLE 3

Substantially the same procedure as that of Example 1 except that zinc oxide ("C7-2" manufactured by Toyo CCI Co., Ltd.) was used instead of the titanium oxide was repeated to obtain a zinc oxide catalyst having 1 wt. % of palladium fixed thereon (Sample No. 3).

EXAMPLE 4

Substantially the same procedure as that of Example 1 except that magnesium oxide ("100A" manufactured by Ube Industries, Ltd.) was used instead of the titanium oxide was repeated to obtain a magnesium oxide catalyst having 1 wt. % of palladium fixed thereon (Sample No. 4).

TEST EXAMPLE 1

Each of Samples Nos. 1 to 4 was sieved out to obtain a 70-to-120 mesh powder, 0.30 g of which was filled in a quartz tube of 10 mm in inner diameter, through which Test Gas 1 (helium gas containing 1,000 ppm of nitrogen monoxide, 3,000 ppm of hydrogen, 5 vol. % of oxygen and 10 vol. % of water) was passed at a flow rate of 100 ml/min at a temperature as shown in Table 1 to measure the concentrations of the resulting nitrogen and nitrous oxide. The conversion (rate of reduction) of nitrogen monoxide to nitrogen and the rate of removal of nitrogen monoxide were calculated from the results of measurement according to the following equations:

conversion (%) to nitrogen=[(nitrogen concn. (ppm) at catalyst layer outlet)×2]/nitrogen monoxide concn. (ppm) at catalyst layer inlet×100.

rate (%) of removal of nitrogen monoxide=[(nitrogen concn. (ppm) at catalyst layer outlet+nitrous oxide concn. (ppm) at catalyst layer outlet)×2]/nitrogen monoxide concn. (ppm) at catalyst layer inlet×100.

The results are shown in Table 1. Also the results of the foregoing test carried out using titanium oxide (Comparison 1) and aluminum oxide (Comparison 2) are shown in Table 1 for the purpose of comparison.

It can be understood from the results in Table 1 that no substantial reaction occurred at 50 to 400° C. in the presence of Comparison 1 or Comparison 2 when 5% of oxygen existed, and it can also be understood from the results of measurement of the hydrogen concentration during the test that a desired reaction hardly occurred because a reaction of hydrogen with oxygen proceeded preferentially at 200 to 400° C. By contrast, it can be understood that the catalysts according to the present invention exhibited an excellent reductive effect even when oxygen existed in a comparatively large amount of 5%.

TEST EXAMPLE 2

Each of Samples Nos. 1 and 2 was sieved out to obtain a 70-to-120 mesh powder, 0.30 g of which was filled in a middle portion of a branch quartz tube of 10 mm as shown in FIG. 1. Test Gas 2 (helium gas containing 2,000 ppm of nitrogen monoxide, 10 vol. % of oxygen and 10 vol. % of water) was passed through one branch of the tube at a flow rate of 50 ml/min, while a hydrogen-containing gas (helium gas containing 6,000 ppm of hydrogen and 10 vol. % of water) was flowed through the other branch of the tube at a flow rate of 50 ml/min, whereby the two gases were combined and mixed with each other simultaneously in the catalyst layer positioned in a middle portion of the quartz branch tube (at a temperature as shown in Table 2) to measure the concentrations of the resulting nitrogen and nitrous oxide in the mixed gas flowing from the outlet of the quartz branch tube. The conversion (rate of reduction) of nitrogen monoxide to nitrogen and the rate of removal of nitrogen monoxide were calculated in the same manner as in Test Example 1. The results are shown in Table 2.

TABLE 1

| Catalyst | Rate of Reduction to Nitrogen (%) [Rate of Removal of Nitrogen Monoxide (%)] | | | | | | | |
| --- | --- | --- | --- | --- | --- | --- | --- | --- |
| | 50° C. | 100° C. | 150° C. | 200° C. | 250° C. | 300° C. | 350° C. | 400° C. |
| No. 1 Pd/TiO$_2$ | 5.4 | 21.7 | 6.4 | 2.1 | 10.8 | 27.4 | 28.4 | 12.4 |
| | (12.7) | (47.5) | (13.5) | (5.4) | (14.2) | (44.9) | (52.8) | (32.5) |
| No. 2 Pd/Al$_2$O$_3$ | 0 | 2.7 | 0 | 0 | 9.2 | 14.1 | 15.8 | 4.5 |
| | (0) | (2.7) | (0) | (0) | (13.2) | (29.8) | (27.5) | (8.5) |
| No. 3 Pd/ZnO | 0 | 12.4 | 6.3 | 0 | 8.7 | 15.7 | 20.2 | 8.4 |
| | (0) | (30.2) | (10.2) | (0) | (12.8) | (22.4) | (39.8) | (20.1) |
| No. 4 Pd/MgO | 0 | 2.3 | 0 | 0 | 5.8 | 26.4 | 25.1 | 4.5 |
| | (0) | (12.4) | (5.4) | (2.1) | (8.7) | (39.8) | (37.8) | (8.1) |
| Comparison 1) TiO$_2$ | 0 | 0 | 0 | 0 | 0.1 | 0.1 | 0 | 0 |
| | (0) | (0) | (0) | (0) | (0.1) | (0.1) | (0) | (0) |
| Comparison 2) Al$_2$O$_3$ | 0 | 0 | 0 | 0 | 0 | 0.2 | 0 | 0 |
| | (0) | (0) | (0) | (0) | (0) | (0.2) | (0) | (0) |

Note)
The numerical values in ( ) show the rates (%) of removal of nitrogen monoxide.

TABLE 2

| Catalyst | Rate of Reduction to Nitrogen (%) [Rate of Removal of Nitrogen Monoxide (%)] | | | | | | | |
|---|---|---|---|---|---|---|---|---|
| | 50° C. | 100° C. | 150° C. | 200° C. | 250° C. | 300° C. | 350° C. | 400° C. |
| No. 1 Pd/TiO$_2$ | 10.2 (20.2) | 32.4 (52.4) | 10.8 (15.4) | 4.2 (8.4) | 30.2 (42.5) | 38.4 (58.7) | 29.8 (60.2) | 15.8 (42.3) |
| No. 2 Pd/Al$_2$O$_3$ | 0 (0) | 5.4 (12.0) | 2.1 (3.4) | 0 (0) | 12.5 (19.8) | 32.5 (41.5) | 28.8 (32.4) | 6.5 (10.2) |

Note)
The numerical values in ( ) show the rates (%) of removal of nitrogen monoxide.

It can be understood from the results in Tables 1 and 2 that nitrogen oxide was successfully removed more efficiently by the method comprising separately feeding the nitrogen monoxide-containing gas and the hydrogen-containing gas using the quartz branch tube even when use was made of the same catalyst as that of Test Example 1 (Sample No. 1 or 2).

As described hereinabove, the catalyst of the present invention can be used to effectively remove nitrogen oxides using hydrogen as the reducing agent particularly even at a temperature as low as 400° C. or below because palladium is fixed on a given metal oxide. Further, it can exhibit an excellent catalytic action without any decrease in the function thereof even in the presence of water and oxygen in the reaction system unlike conventional catalysts. Although hydrogen also exists in an exhaust gas, it can be easily and inexpensively fed from a water electrolysis unit when water and a power source are available.

The catalyst of the present invention having the foregoing features can be suitably used for cars, thermoelectric power plants, factories (boilers and turbines), and various other internal-combustion engines, among which cars, thermoelectric power plants, cogeneration systems, etc., wherein hydrogen can be easily fed with a power source present nearby, are more suitable.

What is claimed is:

1. A method for removing nitrogen oxides, comprising bringing a hydrogen-containing gas and a separate nitrogen oxide-containing gas simultaneously into contact with a nitrogen oxide removal catalyst comprising palladium fixed on at least one metal oxide selected from the group consisting of titanium oxide, aluminum oxide, zinc oxide and magnesium oxide, wherein both gases are permitted to undergo mixing with each other in the catalyst.

2. The method as claimed in claim 1, wherein the contact of gases with the catalyst is effected at a temperature of 100 to 350° C.

3. The method as claimed in claim 1, wherein the catalyst is supported on at least one carrier selected from the group consisting of a metal carrier and a metal oxide carrier.

4. The method as claimed in claim 3, wherein the metal carrier is at least one metal selected from the group consisting of aluminum, iron, copper and stainless steel.

5. The method as claimed in claim 3, wherein the metal oxide carrier is at least one metal oxide selected from the group consisting of aluminum oxide, silica, zeolite, cordierite and titanium oxide.

* * * * *